United States Patent [19]
Knight et al.

[11] Patent Number: 4,791,490
[45] Date of Patent: Dec. 13, 1988

[54] DETECTOR FOR THREE-DIMENSIONAL OPTICAL IMAGING

[75] Inventors: Frederick K. Knight, Wayland; Kenneth Kalata, Cambridge, both of Mass.

[73] Assignee: Massachusetts Institute of Technology, Cambridge, Mass.

[21] Appl. No.: 69,388

[22] Filed: Jul. 2, 1987

[51] Int. Cl.⁴ .......................................... H04N 13/00
[52] U.S. Cl. .................................. 358/209; 358/217; 358/901; 358/89
[58] Field of Search ............................. 358/217–219, 358/901, 89, 209; 250/213 VT

[56] References Cited

U.S. PATENT DOCUMENTS

| | | | |
|---|---|---|---|
| 3,141,106 | 7/1964 | Kapany | 358/901 |
| 3,184,732 | 5/1965 | Haynes | 358/901 |
| 3,294,903 | 12/1966 | Goldmark et al. | 358/109 |
| 4,141,032 | 2/1979 | Haeusler | 358/89 |
| 4,352,127 | 9/1982 | Tsuchiya | 358/217 |
| 4,471,378 | 9/1984 | Ng | 358/217 |
| 4,704,634 | 11/1987 | Kato et al. | 358/217 |

*Primary Examiner*—Jin F. Ng
*Assistant Examiner*—Stephen Brinich

[57] ABSTRACT

The detector includes a focusing lens for focusing pulsed laser light reflected from an object onto a fiber optic array. The fiber optic array is configured to receive a two-dimensional image from the focusing lens and to convert the two-dimensional image into a line image. A streak camera responsive to light from the fiber optic array provides time resolution for the light from each of the fibers in the array. A two-dimensional detector records the light output from the streak camera and electronics store data and process information to construct three-dimensional images.

27 Claims, 5 Drawing Sheets

DETECTOR FOR THREE-DIMENSIONAL OPTICAL IMAGING

BACKGROUND OF THE INVENTION

The Government has rights in this invention pursuant to Contract Number F19628-85-C-0002 awarded by the Department of the Air Force.

This invention is a detector for three-dimensional optical imaging.

Three-dimensional optical imaging has application in areas such as robotic vision and object recognition for discrimination. Scientific applications where depth perception is important include tomography in which the surface of an object is mapped and situations in which reflections from some penetrating radiation are converted to light (near infrared through ultraviolet), and remote sensing of some macroscopic object. Methods are known for obtaining a three-dimensional record of a distant object or scene from a single viewpoint. One method uses a rotating lens and another method uses an image converter tube (a framing camera or streak camera operated in a two-dimensional framing mode). These methods are described by J. S. Courtney-Pratt, "*High Speed Photography to Provide a Three-Dimensional View*", SPIE, 348 (1982) 254. The method using the streak camera is limited to approximately 30 inputs. See, J. Chang et al., "*Photonic Methods of High Speed Analog Data Recording*", Rev. Sci. Instrum., 56 (1985) 1861. The time resolution of the framing camera of Courtney-Pratt was limited to approximately one nanosecond, which correspondingly limited depth resolution.

SUMMARY OF THE INVENTION

The detector according to the invention for three-dimensional optical imaging includes a focusing lens and a fiber optic array to receive a two-dimensional image from the lens. The fiber optic array converts the two-dimensional image into a line image. A streak camera responds to light from the optical fibers and provides time resolution for the light from each of the fibers. A two-dimensional detector records the light output from the streak camera and electronic apparatus stores and processes the information from the two-dimensional detector.

In a preferred embodiment, the fiber optic array has a square configuration at one end for receiving the two-dimensional image from the focusing lens and a linear configuration at the other end for coupling light into the streak camera. In this embodiment, the square configuration comprises a 25×25 array. The camera may be designed to use a lower resolution array such as a 16×16 array. The streak camera includes a micro-channel plate for amplification and the two-dimensional detector may be a silicon intensified target vidicon or a charge coupled device. The streak camera has a relative time resolution of 50 picoseconds, resulting in a depth resolution of about 0.5 cm. The detector having 25×25 angular elements and 400 time elements will have a framing rate of 4 hertz or up to 30 hertz for a limited time.

In another particularly preferred embodiment, a relay optic system including lenses and mirrors is provided to couple light from the fiber optic array output (a line image) to the streak camera. In this embodiment, the microchannel plate is located outside the streak camera and a reducing fiber optic coupler couples light from the streak camera to the two-dimensional detector such as a vidicon.

The detector of the present invention permits three-dimensional optical imaging of objects with a depth resolution of approximately 0.5 cm. Both stationary and moving objects can be imaged with a framing rate of 4 hertz at the maximum resolution or faster at decreased resolution. The detector can thus be used for remote sensing, robotics, and high speed, parallel processing of analog signals.

DESCRIPTION OF THE PREFERRED EMBODIMENT

A brief discussion of the theory underlying the present invention will first be given. Consider a short pulse of light reflected from an object. In principle, it is possible to produce a three-dimensional image of the object by dividing this reflected light into time slices, so that the light reflected from different depths on the object is divided into different two-dimensional images. The three-dimensional image is then a composite of the resulting two-dimensional images, each one from a unique depth or range on the object. To obtain a depth resolution of 10 cm, for example, the necessary time resolution is $(2 \times 10 \text{ cm}) \div (3 \times 10^{10} \text{ cm/s})$ or $\frac{2}{3}$ nanosecond where the factor of 2 comes from the round trip path of the reflected light. Note that the pulse width of light must be this duration or shorter. The time resolution is necessary for each element of the two-dimensional image. Thus, angular resolution yields cross range spatial resolution on the object, and time resolution yields the range resolution. Resolution elements on the object will thus have two angular coordinates and one time coordinate.

Figure 1:
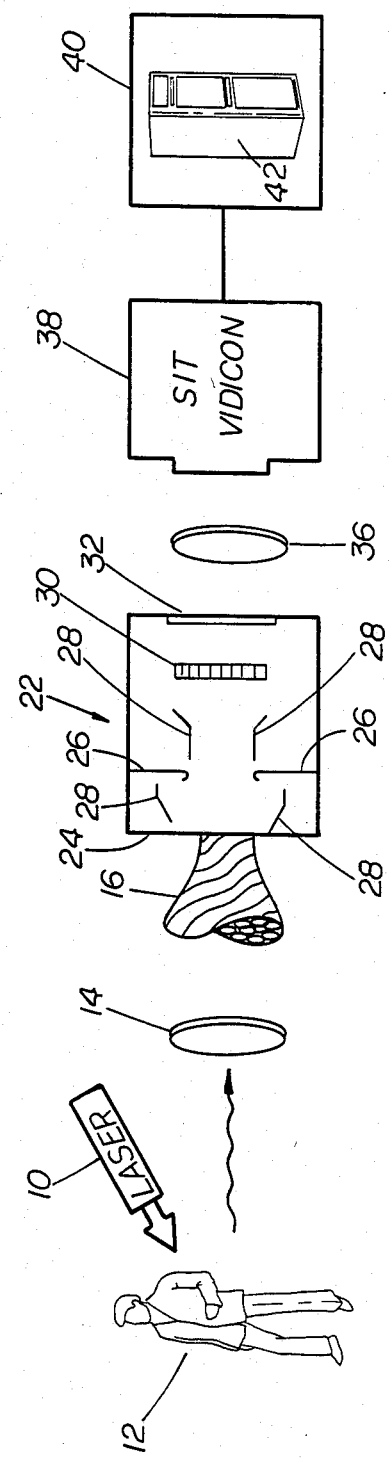
FIG. 1 is a schematic illustration of the invention disclosed herein.
Figure 2:
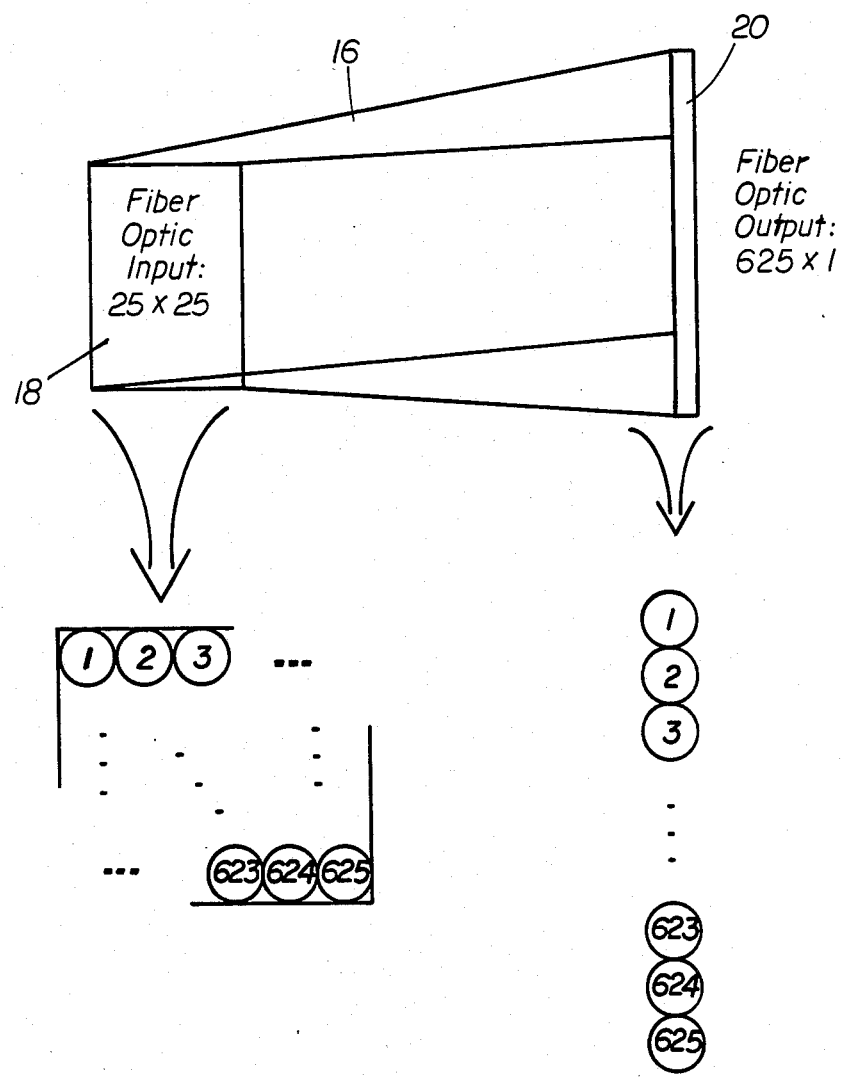
FIG. 2 is a schematic illustration of the fiber optic array used in the invention.

With reference now to FIG. 1, a laser 10 generates 30–100 picosecond laser pulses which illuminate an object such as a person 12 whose three-dimensional image is to be recorded. A suitable wavelength range for the laser 10 is 0.8 μm to 0.25 μm. Light reflected from the object 12 is focused by a focusing lens 14 onto a fiber optic array 16. As may be seen in FIG. 2, the fiber optic array 16 includes an input face 18 in the form of a square array, for example, a 25×25 array including a total of 625 optical fibers. The optical fiber array 16 is spread out at an output end 20 to form a linear array of the optical fibers. The array 16 thus dissects a two-dimensional image at the input surface 18 into a line image at the output surface 20.

The line image output of the fiber optic array 16 forms an input to a streak camera 22. The streak camera 22 includes a photocathode 24 which generates electrons in response to light from the fibers in the fiber optic array 16. The electrons are accelerated by the electric field established by the photocathode 24 and an anode 26. The electrons are focused by focusing electrodes 28 and pass through a micro-channel plate 30 which amplifies the number of electrons. The electrons then impinge upon a phosphor screen 32 to emit light.

Figure 4:
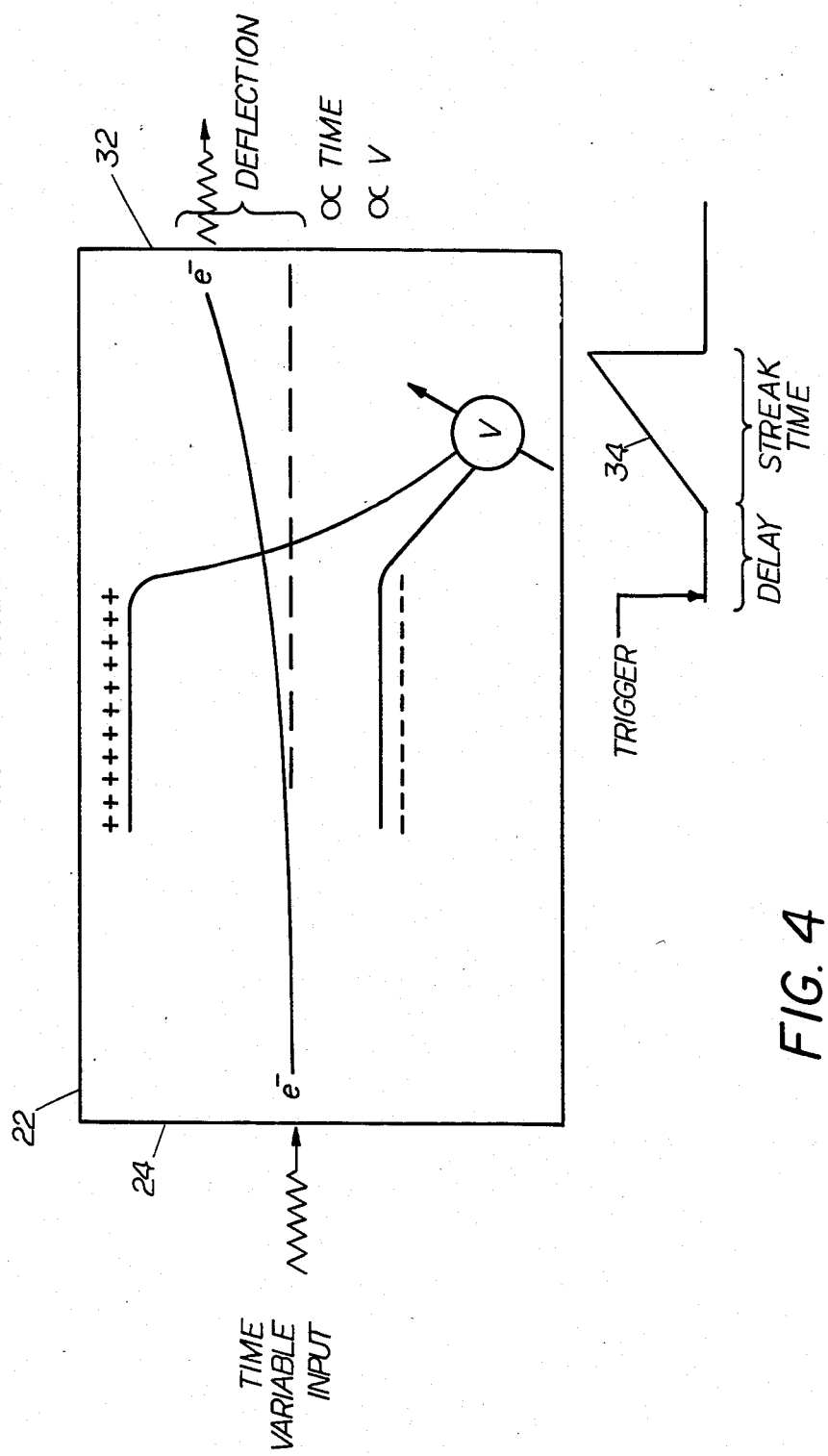
FIG. 4 is a schematic diagram of a streak camera used in present invention.

The streak camera 22 introduces time resolution by means of an electronic sweep. As shown schematically in FIG. 4, a ramp voltage 34 is applied as electrons travel through the streak camera 22. The amount of deflection of the electrons and the location of the resulting light from the phosphor screen 32 is proportional to the time at which light reached the photocathode 24 which is related to the depth characteristics of the imaged object. A lens 36 couples the light from the phosphor screen 32 into a two-dimensional detector 38, such as a SIT vidicon, and controls image size. Other detectors such as a CCD (charge coupled device) detector may be used to record the intensity and position of the light flashes on the phosphor screen. Information from the detector 38 is processed by electronics 40 which includes a digital computer 42.

Figure 3:
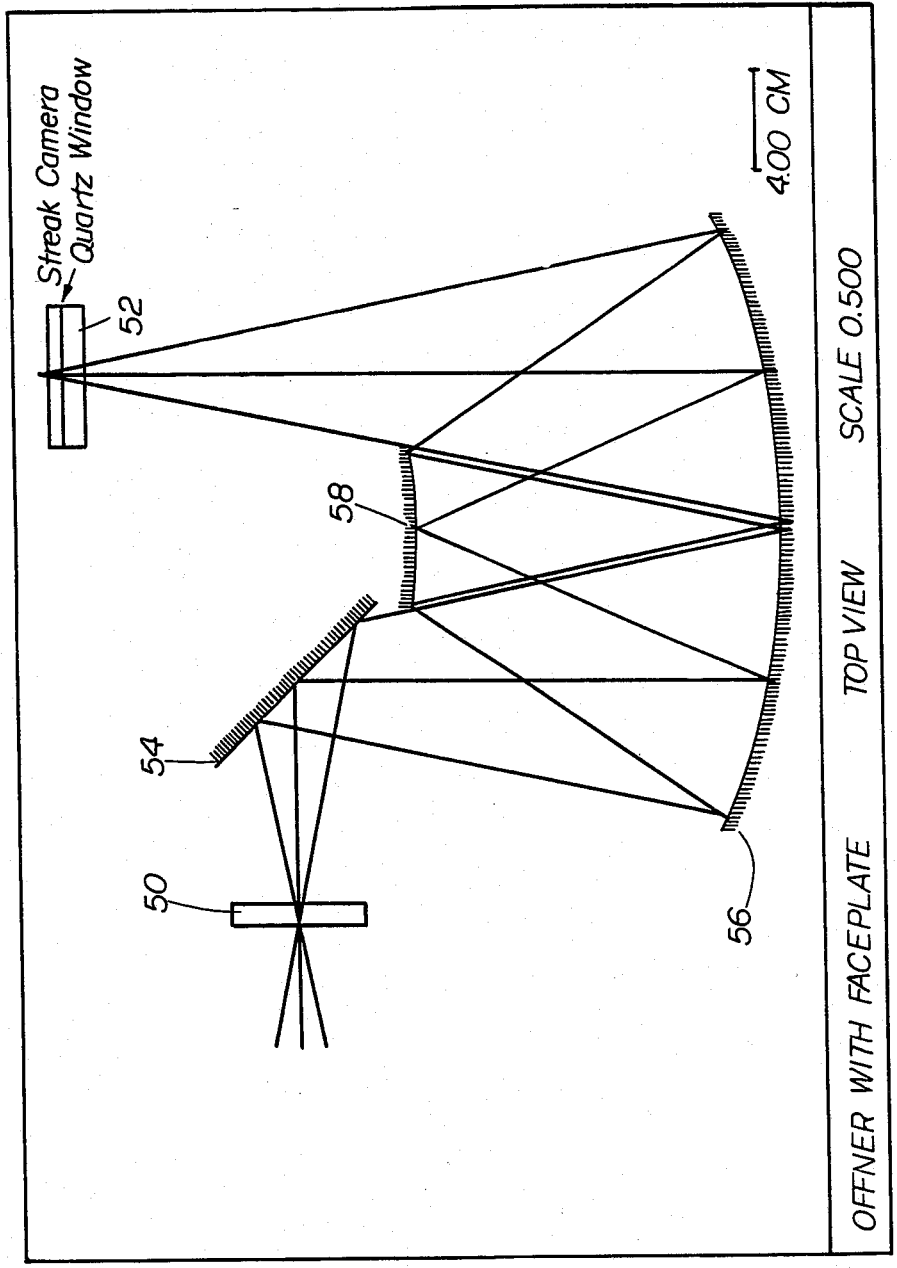
FIG. 3 is a plan view of optics for coupling light from the optic array into a streak camera.

Optics may be included to couple the output of the fiber optic array 16 to the streak camera 22. Such an optical system is shown in FIG. 3. This optical system would be interposed between the fiber optic array 16 and the streak camera 22. In particular, the optical system shown in FIG. 3 includes lenses 50 and 52 along with mirrors 54, 56 and 58. The mirrors 56 and 58 are curved to compensate for the slight curvature (not shown) of the photocathode 24 of the streak camera 22.

Figure 5:
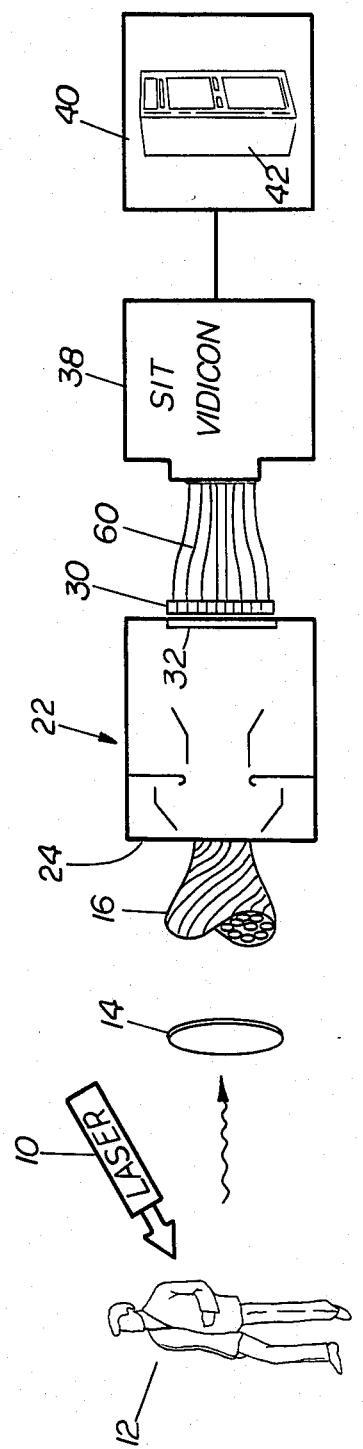
FIG. 5 is a schematic illustration of a particularly preferred embodiment of the invention.

A particularly preferred embodiment of the present invention is shown in FIG. 5. In this embodiment the microchannel plate 30 is located outside of the streak camera 22 rather than inside as shown in FIG. 1. The output of the microchannel plate 30 of FIG. 5 is coupled to the SIT vidicon 38 by a reducing fiber optic coupler 60 rather than by the coupling lens 36 in the embodiment of FIG. 1. The relay or coupling optics shown in FIG. 3 will also be used to couple the output of the fiber optic array 16 to the streak camera 22.

The embodiments illustrated in FIGS. 1 and 5 include up to $25 \times 25$ angular elements and up to 400 time elements. The framing rate of the system is determined by the maximum transfer rate to the data storage. At a maximum resolution ($25 \times 25 \times 400$) the framing rate is 4 hertz, but can be increased with decreased resolution in any dimension. The detector of the invention can image objects with an angular resolution 4% of the field of view of the input lens. Both stationary and moving objects can be imaged with a framing rate of 4 hertz at the maximum resolution or faster at decreased resolution.

The focusing lens 14 may be a set of lenses with focal lengths in the range of 0.4–4 cm. The fiber optic array 16 transmits ultraviolet light so no wavelength converter is necessary. A suitable coupling lens is F/2 to match the numerical aperture of the fiber optic array 16. A suitable streak camera is available from EG&G Energy Measurements and has a quartz input window, S-20 photocathode of 50 mm diameter, and has a nominal 10 line pairs per millimeter resolution. A suitable micro-channel plate 30 is available from ITT and has a 40 mm aperture. A suitable SIT Vidicon 38 is a RCA 4804 low light level tube. The electronics 40 includes a Digital Equipment Corporation Microvax II computer and QDS 100 electronics. The electronics are described by Kalata in *"Highly Versatile Computer-Controlled Television Detector System"* SPIE, 331 (1982) 69. The teachings of this reference are incorporated herein by reference. With this hardware, the system will have absolute time resolution of less than one nanosecond and relative time resolution of 50 picoseconds. Thus, the depth resolution is about 0.5 cm. The angular resolution gives cross range resolution proportional to the distance to the object over an angle defined by the input optics. For example, a 1 meter object would have 4 cm$\times$4 cm cross-range pixels, and, if viewed at a distance of 10 meters would produce an image 2 cm$\times$2 cm on a focal plane of a lens with a focal length of 20 cm. The detector of the invention has sufficient time resolution to obtain range resolution on an object, that is, to resolve the object into range slices by sensing the time delay due to extra distance traveled by the 30–100 pico second laser pulses. The system will detect light received over a period of 25 to 400 nanoseconds and in the wavelength range of 0.8 $\mu$m to 0.25 $\mu$m. With this performance, the detector can be used for remote sensing, robotics, and high speed, parallel processing of analog signals.

What is claimed is:

1. Detector for three-dimensional optical imaging comprising:
   a focusing lens;
   a fiber optic array configured to receive a two-dimensional image from the lens and to convert the two-dimensional image into a line image;
   a streak camera responsive to light from the fiber optic array adapted to provide time resolution for light from each fiber of the fiber optic array;
   a two-dimensional detector to record the light output from the streak camera; and
   electronic apparatus to store and process information from the two-dimensional detector.

2. The detector of claim 1 wherein the streak camera includes a micro-channel plate for amplification.

3. The detector of claim 1 further including optics adapted to couple the output of the fiber optic array to the streak camera.

4. The detector of claim 3 wherein the optics include a coupling lens whose aperture matches the aperture of the fiber optic array.

5. The detector of claim 1 wherein the focusing lens is a set of lenses.

6. The detector of claim 1 wherein the focusing lens has a focal length in the range of 0.4–4 cm.

7. The detector of claim 1 wherein the fiber optic array has a square configuration at an end for receiving the two-dimensional image and a linear configuration at the other end for coupling light into the streak camera.

8. The detector of claim 7 wherein the square configuration comprises a $25 \times 25$ array.

9. The detector of claim 1 wherein the streak camera includes circuitry for generating a ramp voltage to provide the time resolution.

10. The detector of claim 1 wherein the streak camera has a resolution of approximately 10 line pairs per millimeter.

11. The detector of claim 2 wherein the micro-channel plate has a 40 mm diameter.

12. The detector of claim 1 wherein the two-dimensional detector is a silicon intensified target (SIT) vidicon.

13. The detector of claim 1 wherein the two-dimensional detector is a charge coupled device (CCD).

14. The detector of claim 1 wherein the elctronic apparatus includes a general purpose digital computer.

15. The detector of claim 1 having a resolution of $25 \times 25$ angular elements and 400 time elements.

16. The detector of claim 1 having a framing rate of 4 hertz.

17. The detector of claim 1 wherein the streak camera has a relative time resolution of 50 picoseconds.

18. The detector of claim 1 having an angular resolution of approximately 4% of the field of view of the focusing lens.

19. The detector of claim 1 further including a laser for illuminating an object with pulses in the range of 30–100 picoseconds.

20. The detector of claim 1 adapted to detect light received over a period of 25 to 400 nanoseconds.

21. The detector of claim 19 wherein the laser generates light in the range of 0.8 $\mu$m to 0.25 $\mu$m.

22. The detector of claim 1 having a depth resolution of approximately 0.5 cm.

23. Method for three-dimensional optical imaging comprising
   focusing light reflected from an object onto a fiber optic array which converts a two-dimensional image into a line image;
   determining time resolution for light from each fiber of the fiber optic array; and
   processing the time resolution information to produce three-dimensional images of objects.

24. Three-dimensional optical imaging system comprising
   a laser adapted to generate light pulses to illuminate an object;
   a focusing lens to focus light reflected from the object;
   a fiber optic array configured to receive a two-dimensional image from the lens and to convert the two-dimensional image into a line image;
   a streak camera responsive to light from the fiber optic array adapted to provide time resolution for light from each fiber of the fiber optic array;
   a two-dimensional detector to record the light output from the streak camera; and
   electronic apparatus to store and process information from the two-dimensional detector.

25. The detector of claim 1 further including a microchannel plate to amplify light from the streak camera.

26. The detector of claim 25 further including fiber optic coupler to couple light from the microchannel plate to the two-dimensional detector.

27. The detector of claim 7 wherein the square configuration comprises a 16×16 array.

* * * * *

UNITED STATES PATENT AND TRADEMARK OFFICE
CERTIFICATE OF CORRECTION

PATENT NO. : 4,791,490
DATED : December 13, 1988
INVENTOR(S) : Frederick K. Knight and Kenneth Kalata It is certified that error appears in the above-identified patent and that said Letters Patent is hereby corrected as shown below:

Column 2, line 42, "cross range" should be --cross-range--.

Column 3, line 63, "QDS 100" should be --QDS-100--.

Column 4, line 3, "cross range" should be --cross-range--.

Column 6, line 21, after "including", insert --a reducing--.

Signed and Sealed this

Sixteenth Day of May, 1989

Attest:

DONALD J. QUIGG

Attesting Officer

Commissioner of Patents and Trademarks